United States Patent
Barve et al.

(10) Patent No.: US 9,928,003 B2
(45) Date of Patent: Mar. 27, 2018

(54) MANAGEMENT OF WRITABLE SNAPSHOTS IN A NETWORK STORAGE DEVICE

(71) Applicant: HEWLETT PACKARD ENTERPRISE DEVELOPMENT LP, Houston, TX (US)

(72) Inventors: Anagha Barve, San Jose, CA (US); Lavina Jain, San Jose, CA (US); Umesh Maheshwari, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 11 days.

(21) Appl. No.: 15/143,296

(22) Filed: Apr. 29, 2016

(65) Prior Publication Data

US 2016/0320978 A1 Nov. 3, 2016

Related U.S. Application Data (60) Provisional application No. 62/156,106, filed on May 1, 2015.

(51) Int. Cl.
*G06F 3/06* (2006.01)
*G06F 9/455* (2018.01)
*G06F 11/14* (2006.01)

(52) U.S. Cl.
CPC .......... *G06F 3/065* (2013.01); *G06F 3/0619* (2013.01); *G06F 3/0689* (2013.01); *G06F 9/45558* (2013.01); *G06F 11/1446* (2013.01); *G06F 2009/45562* (2013.01); *G06F 2009/45579* (2013.01); *G06F 2009/45583* (2013.01); *G06F 2009/45595* (2013.01); *G06F 2201/815* (2013.01); *G06F 2201/84* (2013.01)

(58) Field of Classification Search
CPC .................. G06F 11/1446; G06F 2201/84
See application file for complete search history.

(56) References Cited

U.S. PATENT DOCUMENTS

| | | | |
|---|---|---|---|
| 7,165,156 B1 | 1/2007 | Cameron et al. | |
| 7,191,304 B1 | 3/2007 | Cameron et al. | |
| 7,743,031 B1 | 6/2010 | Cameron et al. | |
| 8,732,417 B1 * | 5/2014 | Stringham .......... | G06F 11/1448 711/162 |
| 8,874,841 B2 | 10/2014 | Patterson et al. | |

* cited by examiner

*Primary Examiner* — Edward J Dudek, Jr.

(57) ABSTRACT

Methods, systems, and computer programs are presented for creating writable snapshots of logical data units in a network storage array. One method includes operations for receiving a request to create a snapshot at a storage device, the snapshot being a point-in-time copy of a volume in the storage device, and for creating the snapshot with a first snap-point corresponding to a state of the volume when the snapshot is created. The snapshot is writeable when the snapshot is created. Further, the method includes operations for receiving one or more requests to make changes to the snapshot, for creating one or more snap-points for the snapshot after processing the one or more requests, and for closing the snapshot. The snapshot is not writeable after the snapshot is closed and access to the snapshot, after closing the snapshot, accesses data associated with a last snap-point of the snapshot.

20 Claims, 8 Drawing Sheets

MANAGEMENT OF WRITABLE SNAPSHOTS IN A NETWORK STORAGE DEVICE

CLAIM OF PRIORITY

This application claims priority from U.S. Provisional Patent Application No. 62/156,106, filed May 1, 2015, and entitled "Management of Writable Snapshots in a Network Storage Device." This provisional application is herein incorporated by reference.

BACKGROUND

1. Field of the Invention

The present embodiments relates to methods, systems, and programs for creating time snapshots of data, and more particularly, methods, systems, and computer programs for creating snapshots of logical data units in a network storage array.

2. Description of the Related Art

Network storage, also referred to as network storage systems or storage systems, is computer data storage connected to a computer network providing data access to heterogeneous clients. Typically network storage systems process a large amount of Input/Output (TO) requests, and high availability, speed, and reliability are desirable characteristics of network storage.

Sometimes, copies of a volume of data are made to keep the state of the volume at a point in time, and these copies are referred to as snapshots. For example, a snapshot is taken when a backup is made of a logical unit drive (LUN). Sometimes, there is a need to synchronize data in the snapshot with another external event, such as when a hypervisor makes a backup of a virtual machine. However, it may be difficult to synchronize exactly the snapshot with the state of the virtual machine as some transactions may be queued on the storage device or the actions, to take the snapshot and backup the virtual machine, may not occur at the exact point in time.

It is in this context that embodiments arise.

SUMMARY

Methods, devices, systems, and computer programs are presented for creating writable snapshots of logical data units in a network storage array. It should be appreciated that the present embodiments can be implemented in numerous ways, such as a method, an apparatus, a system, a device, or a computer program on a computer readable medium. Several embodiments are described below.

One general aspect includes a method including having an operation for receiving a request to create a snapshot at a storage device, the snapshot being a point-in-time copy of a volume in the storage device. The method also includes an operation for creating the snapshot with a first snap-point corresponding a state of the volume when the snapshot is created, where the snapshot is writeable when the snapshot is created. The method also includes operations for receiving one or more requests to make changes to the snapshot, for creating one or more snap-points for the snapshot after processing the one or more requests, and for closing the snapshot. The snapshot is not writeable after the snapshot is closed, and access to the snapshot, after closing the snapshot, accesses data associated with a last snap-point of the snapshot.

One general aspect includes a storage device, including a memory having a computer program, permanent storage configured to store data of a volume, a network interface, and a processor for executing the computer program. When the processor executes the computer program, the processor is configured to receive a request to create a snapshot, the snapshot being a point-in-time copy of a volume in the storage device. Further, the processor creates the snapshot with a first snap-point corresponding a state of the volume when the snapshot is created, and the snapshot is writeable when the snapshot is created. Further, the processor is configured to receive one or more requests to make changes to the snapshot and the processor creates one or more snap-points for the snapshot after processing the one or more requests. The processor is configured to close the snapshot. The snapshot is not writeable after the snapshot is closed, and access to the snapshot after closing the snapshot accesses data associated with a last snap-point of the snapshot.

One general aspect includes a non-transitory computer-readable storage medium storing a computer program for managing data in a storage device. The computer-readable storage medium includes program instructions for receiving a request to create a snapshot at a storage device, the snapshot being a point-in-time copy of a volume in the storage device, and program instructions for creating the snapshot with a first snap-point corresponding a state of the volume when the snapshot is created, where the snapshot is writeable when the snapshot is created. The storage medium also includes program instructions for receiving one or more requests to make changes to the snapshot, program instructions for creating one or more snap-points for the snapshot after processing the one or more requests, and program instructions for closing the snapshot. The snapshot is not writeable after the snapshot is closed, and access to the snapshot after closing the snapshot accesses data associated with a last snap-point of the snapshot.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for creating writable snapshots of logical data units in a network storage array. It will be apparent, that the present embodiments may be practiced without some or all of these specific details. In other instances, well-known process operations have not been described in detail in order not to unnecessarily obscure the present embodiments.

In some customer environments, there is a need for synchronizing the data in a volume with some of the activities of an application. For example, when Microsoft™ Hyper-V backs up a virtual machine (VM), Hyper-V creates a copy of the VM state. After the VM data has been saved, Hyper-V requests the network device to create a snapshot of the state associated with that VM. However, between the time when the Hyper-V backs up the data, and the time when the storage array creates the snapshot, there is a period of time where changes to the VM are possible. Therefore, there is a lack of synchronism between the Hyper-V backup data and the volume snapshot.

Snapshots are not usually modifiable because they represent the state of a volume at a point in time, but in order to support synchronization scenarios, the network device creates a special writable snapshot, which is a snapshot that can be modified. This permits synchronizing the data in the snapshot, without having to create a clone (which is modifiable). The writable snapshot allows a few changes to be made, but it doesn't require as many resources as a full clone of the volume.

In order to support writable snapshots, the concept of snap-point is introduced, where a snap-point of a snapshot represents the snapshot at a point in time. When the snapshot is first created, a first snap-point $p_1$ is created. Afterwards, the snapshot takes some changes, and a second snap-point $p_2$ is created. In one scenario, from the point of view of the client, the snapshot is represented by the second snap-point $p_2$, and when the client accesses the snapshot, the data from $p_2$ is accessed. For the case of Hyper-V, $p_1$ is created with the snapshot, then Hyper-V makes changes to the snapshot to reflect the changes to the volume between the moment Hyper-V backed up the VM and the time when the snapshot was created. After the changes, $p_2$ is created, and access to the snapshot will access the state of the snapshot at $p_2$. The snapshot is now synchronized with the VM backup.

Figure 1:
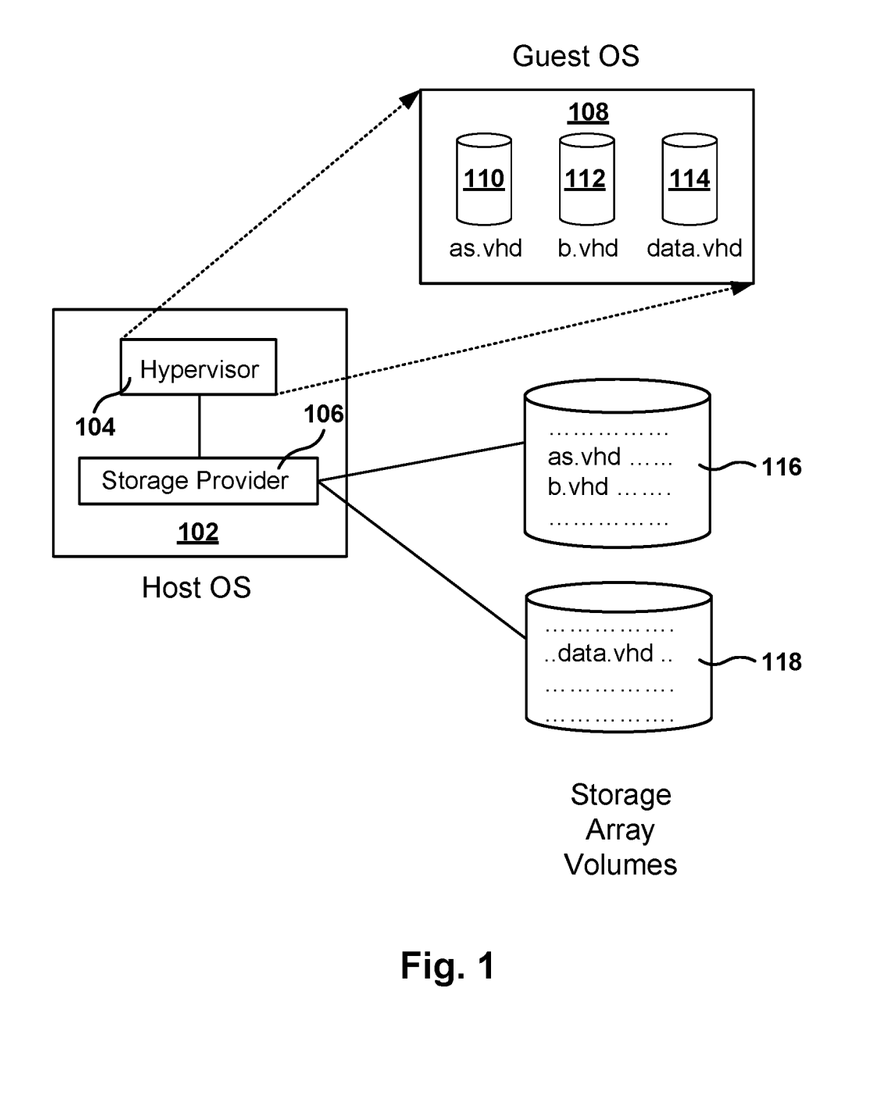
FIG. 1 illustrates a host device storing data in a network storage device, according to one embodiment.

FIG. 1 illustrates a host device 106 storing data in a network storage device, according to one embodiment. As used herein, a network storage device 106, or storage device, is also referred to as a storage array. In one embodiment, the data within the storage array is organized in volumes 116, 118 (e.g., a drive), where each volume is a single accessible storage area. For example, in a hypervisor environment 102, the application connected to the storage-array volumes is a virtual machine (VM) running in a guest OS 108. Each volume appears as a disk to the application, and the various virtual disks 110, 112, 114 created by the VM are files/data stored in the storage array volumes.

Some applications, (e.g., Hyper-V, SQL, MS Exchange) use auto-recovery mechanisms to make snapshots of a volume in a network storage device, where the snapshots are consistent with a backup copy of an application. Often, Hyper-V periodically backs up VMs according to a VM-backup schedule. In one embodiment, during the backup procedure, the guest OS 108 saves a copy of all virtual disks, and afterwards, the guest OS creates writable snapshots of all volumes. Afterwards, the guest OS performs an auto recovery of the snapshots on the storage array. At this time, the writable snapshot is inconsistent with the copy created by the guest OS because the guest OS may continue to write/delete/change data after the initial operation. Hence, the guest OS needs to do auto recovery and roll back those extra changes in order to create an application-consistent snapshot.

In other words, the hypervisor 104 takes a snapshot of a virtual machine, and then the hypervisor makes some changes to the data to bring the snapshot to a consistent state associated with another point in time. There is a time elapsed between the time that the hypervisor creates a backup, and the time when the storage array creates the snapshot. Thus, the original data in the snapshot is not consistent (e.g., with a VM backup), so changes are made to the snapshot to make the snapshot consistent with the backup.

In one embodiment, the requirements for creating writable snapshots include:
  The state of the snapshot that is relevant to the application is the one that contains all writes that went into the volume/snapshot as part of the auto-recovery mechanism.
  The base snap-point created on the parent volume before auto recovery and the snapshot available after auto recovery are known as the same object to the application.
  The application must identify the auto-recovered snapshot by a unique identifier. For the application, the writable snapshot created after modifying the snapshot is the one available after auto-recovery.
  The application should be able to mount the auto-recovered snapshot, that is, the snapshot should be writable.
  Any writes to the auto-recovered snapshot must be done on top of any writes that were already done as part of auto-recovery. The writes done after auto-recovery need not be, and must not be preserved in, a clone, restore, or replica.
  The storage array must be able to restore the volume to the point of auto-recovery. Cloning off a dual-point writable snapshot and replicated dual-point writable snapshots should include the writes done to the writable snapshot as part of the auto-recovery.
  Disallow clone and restore operations if the snapshot is not "ready," that is, if the snapshot was created with the intent of running auto-recovery (e.g., a snapshot with a dual-point implementation) and has not been fully recovered yet (that is, the second snap-point after auto-recovery has not been created yet). This is to prevent the applications or users from creating an inconsistent and potentially incorrect copy of the volume that is based off a snapshot that is about to be changed by the application using the auto-recovery mechanism.
  If a "dual-point" writable snapshot never becomes ready (e.g., never creates the second snap-point) (e.g., because the application crashed), then there should be a mechanism to either delete that snapshot or convert the snapshot into a "ready" crash-consistent snapshot (e.g., by converting the snapshot into a single-point snapshot).
  Be able to replicate the dual-point snapshot. Any operations on the replica (e.g., promote/demote) should follow the same rules.

Other embodiments may require different capabilities, or a subset of the requirements described hereinabove. Embodiments presented herein will be described with reference to synchronizing a volume for the scenario described above with the hypervisor backing up virtual machines. However, writable snapshots may be used for any other application that requires synchronization of a snapshot with another event that requires making changes to the snapshot in order to bring the state of the volume to a different point in time.

Figure 2:
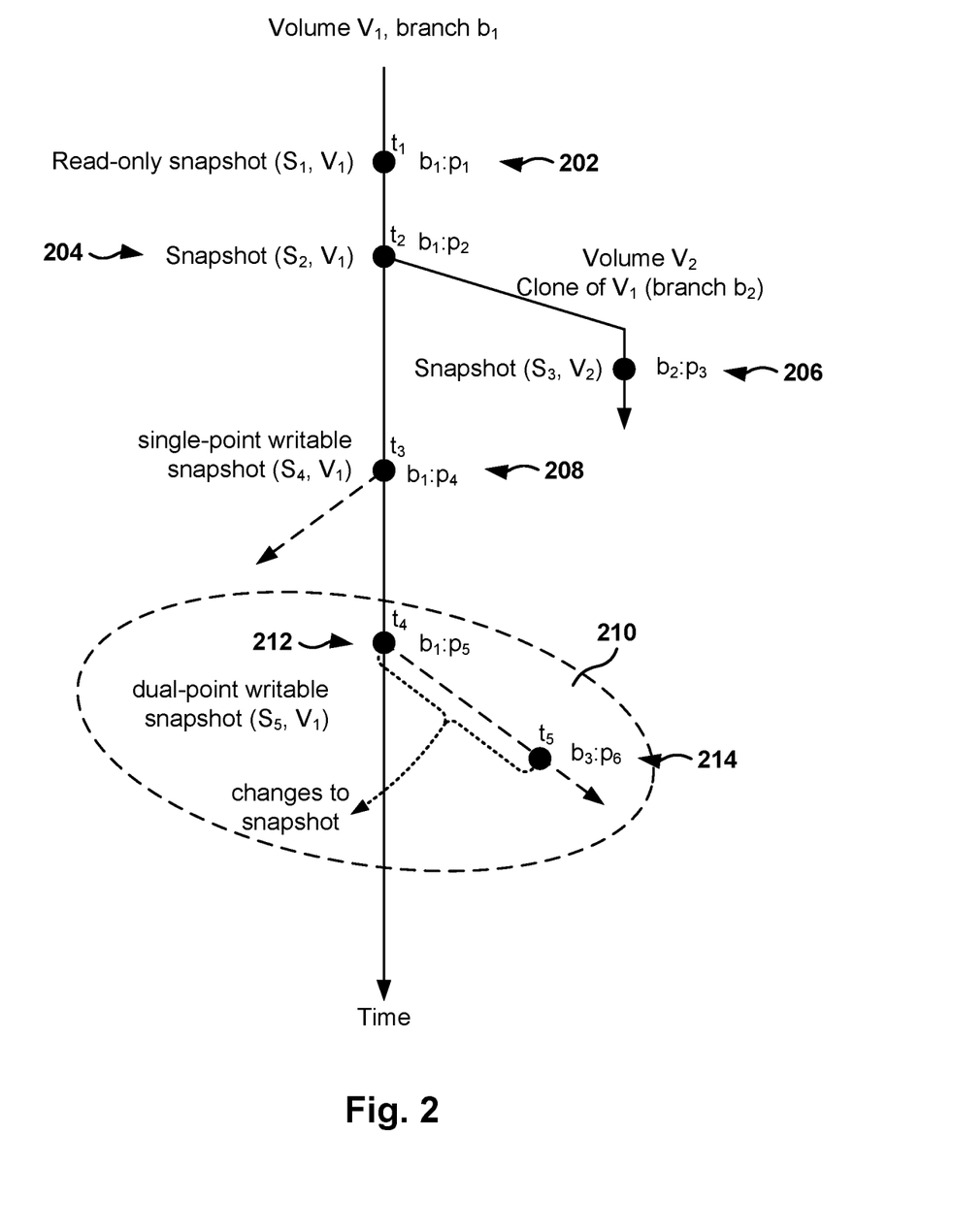
FIG. 2 illustrates the creation of snapshots and clones in a network storage system, according to one embodiment.

FIG. 2 illustrates the creation of snapshots and clones in a network storage system, according to one embodiment. In one embodiment, a snapshot is a point-in-time copy of a volume. As used herein, a "regular" snapshot is a read-only snapshot.

A clone is a read-write copy of a snapshot of a volume, or in other words, a clone is a copy of a volume at a point in time. This means that the snapshot of a volume shares physical storage with the volume (e.g., common blocks of the snapshot and the volume are stored only once), while the blocks of the clone are considered different blocks from the blocks of the original volume and stored separately, although in a deduplication system the blocks may share physical space. Also, the blocks of the volume may be modified independently from the blocks of the volume.

In one embodiment with a deduplicating system, duplicate blocks are stored only once (ideally) and a counter identifies how many volumes are currently accessing that block. For example, if a block in a volume has a counter of 1 and then a clone is created, the counter would be incremented to 2. Then, if the block is deleted/overwritten in the volume, then the counter would go back to 1, because the block is active (i.e., part of the current state of the clone) in the clone, but the block is inactive (i.e., not part of the current state of the volume) in the volume. In this case, the difference between a clone and a snapshot is that when creating a clone, the counters for all the active blocks of the volume would be incremented by 1 to reflect that a new volume is accessing them. On the other hand, when creating a snapshot of the volume, the counters would not be changed, because a new volume has not been created. In another embodiment, in a system without deduplication, creating a clone would require making copies of all the blocks of the volume, while creating a snapshot would not cause the copying of blocks.

A writable snapshot is a snapshot that can be changed or altered. In one embodiment, the writable snapshot is a combination of a base snapshot and a side branch created off the base snapshot, where the base snapshot is a regular snapshot. Any writes done to a writable snapshot go onto the side branch, as discussed in more detail below. Mount and read-write operations in the snapshot access the side branch. However, in one embodiment, replication, restore and clone operations act on the base snapshot, while in other embodiments, these operations will access the latest created snap-point in the snapshot.

In one embodiment, a replica of a writable snapshot, or of a clone created off a writable snapshot, do not contain the writes done to the writable snapshot after its creation. Clones and replicas would contain the volume's data as reflected by the base snapshot. In another embodiment, operations on the writable snapshot include data operations (e.g., mount, read, write, online, offline), and protection operations (e.g., clone, restore and replicate) performed after the creation of the snapshot.

In one embodiment, the volume includes an index (e.g., a tree map associated with a volume $V_1$) for indexing the blocks within the volume. The storage array keeps track of the locations of blocks for all volumes in the storage array. Different methods may be used to index the different blocks, such as a heap, a tree, a vector, etc. In one embodiment, there is a root node at the top of the volume and intermediate nodes with pointers to other blocks or other intermediate nodes. As used herein, this structure is referred to as the cache index, but the cache index may use any other type of data organization.

Referring now to FIG. 2, the volume $V_1$ is an active volume, which means that the blocks of the volume may be read, may be rewritten, may be erased, and that new blocks may be added. When a user requests data from the active volume $V_1$, the read request will serve one or more of the active blocks from volume $V_1$.

Over time, the data administrator may configure the storage array to take snapshots of volume $V_1$ (e.g., periodically or upon command). When a snapshot $S_1$ of the volume $V_1$ is created 202, a new data structure is created for the snapshot. As used herein, a snapshot of a volume may be referred to by a pair of values enclosed in parenthesis, where the first value is the name of the snapshot and the second value is the name of the volume associated with the snapshot, therefore, snapshot $S_1$ may also be referred to as ($S_1$, $V_1$).

However, the blocks of the volume are not copied (i.e., duplicated) and the index for the snapshot utilizes all or part of the index for the volume $V_1$. Just after the snapshot $S_1$ is created, all the blocks of snapshot $S_1$ are equal to the blocks of volume $V_1$. In one embodiment, the index for $S_1$ includes a pointer to the root of volume $V_1$. In another embodiment, snapshots are read only, but in other embodiments, the snapshots are writable, which means that some changes can be made to the snapshot.

As changes are made to the volume (e.g., a data block is overwritten with new data), the structure of the index is changed to reflect these changes, but the structure of the snapshot does not change, thus the snapshot always refers to the blocks that existed in the volume when the snapshot was created.

As used herein, the index that contains the active blocks of the volume is referred to as the tip of the volume, or tip of the drive. Additionally, blocks that cannot be accessed from a host are referred to as dead blocks. On the other hand, the blocks that are accessible from a host are live blocks. The live blocks can be snapshot-only blocks or active blocks. Snapshot-only blocks are blocks that can be accessed only in a snapshot, but not within an active volume. Active blocks are those blocks that can be accessed in the active state of a volume, i.e., the tip of the volume. As used herein an inactive block is a block that is not an active block.

When a clone $V_2$ is created 204 of volume $V_1$, a branch of a snapshot of the volume is created. The new branch is regarded as the root branch of the new volume. The new volume thus created is called a clone. In one embodiment, the clone $V_2$ is a read/write volume and the historic snapshots of volume $V_2$ are shared with the parent snapshot and volume $V_1$.

In one embodiment, every snapshot is a single internal object (a point-in-time) of a volume associated with the snapshot. Embodiments presented herein, provide capabilities for creating additional points in time for the snapshot, which are referred to herein as snap-points. In some embodiments, the snap-points are visible to the application, but in other embodiments, the application is not aware of snap-points and only one representation of the snapshot is available to the application, although multiple snap-points may be implemented within that snapshot. For example, a writable snapshot known to customer by a single object called "S" may be internally implemented using multiple points, such as $p_1$ and $p_2$.

In one embodiment, the purpose of having multiple snap-points is to synchronize the snapshot to a different state for the associated volume. As discussed above, with reference to the hypervisor making a backup of a virtual machine, the ability of changing the snapshot lets the hypervisor synchronize the state of the virtual machine when the backup was made to the state of the snapshot.

In general, changes to the snapshot to create another snap-point are small, but in other embodiments, any type of changes to the snapshot may be supported. The snapshot, and the volume associated therewith, can be managed as a single object, which requires less overhead than dealing with the clone of the volume, because clones require more resources (e.g., making copies of all the blocks of the volume, one or more new indices for the clone, etc.).

With reference to FIG. 2, the vertical arrow down the center represents the state of a volume $V_1$, and some of the operations performed relate to the volume, over time. The vertical down arrow is the main branch of the volume and is referred to as $b_1$. The black dots (e.g., circles) on the vertical arrow, referred to as points or snap-points, represent the state of the volume at a point in time.

Initially, a read-only snapshot ($S_1$, $V_1$) is created 202 of volume $V_1$ at time $t_1$. This is a single-point snapshot associated with snap-point $b_1$:$p_1$ (branch 1, point 1). Later, a clone $V_2$ is created 204 of volume $V_1$ at time $t_2$. Clone $V_2$ is associated with snapshot ($S_2$, $V_1$) at point $b_1$:$p_2$, and clone $V_2$ starts a new branch $b_2$, which is the main branch of clone $V_2$. After changes are made to the clone, a snapshot ($S_3$, $V_2$), at snap-point $b_2$:$p_3$, off clone $V_2$ is created 206 in branch $b_2$.

A single-point writable snapshot ($S_4$, $V_1$) is created 208 of volume $V_1$ at time $t_3$. This is a single-point writable snapshot associated with snap-point $b_1$:$p_4$. The arrow coming off $b_1$:$p_4$ represents that the snapshot is "open" and changes have been made to the writable snapshot, although no snap-points have been created yet at this time.

At $t_4$, another writable snapshot ($S_5$, $V_1$) 210 is created 212 of volume $V_1$. Snapshot ($S_5$, $V_1$) is a dual-point writable snapshot, and is associated with snap-point $b_1$:$p_5$, where changes have been made to this snapshot ($S_5$, $V_1$) in branch $b_3$. After the changes, a new snap-point $b_3$:$p_6$ has been created 214. Since the snapshot has not been "closed yet", branch $b_3$ is still open, represented by an arrow. If the writable snapshot is closed, the branch would be represented by a segment instead of an arrow, and at the end of the segment there would be the last snap-point created in the snapshot.

In one embodiment, closing a branch does not create an additional snap-point. Some embodiments presented herein are described with reference to dual-point writable snapshots, but other embodiments include writable snapshots with more than two snap-points. These writable snapshots are referred to as multi-point writable snapshots.

In one embodiment, from the point of view of the application, only a snap-point of the snapshot is presented, which is the latest snap-point. Therefore, when the application refers to the snapshot, the application is really accessing the latest snap-point in the snapshot. This means that only a single view of the snapshot is provided to the application. This simplifies management and access from the point of view of the application. In other embodiments, multiple snap-points may also be presented to the application.

Figure 3:
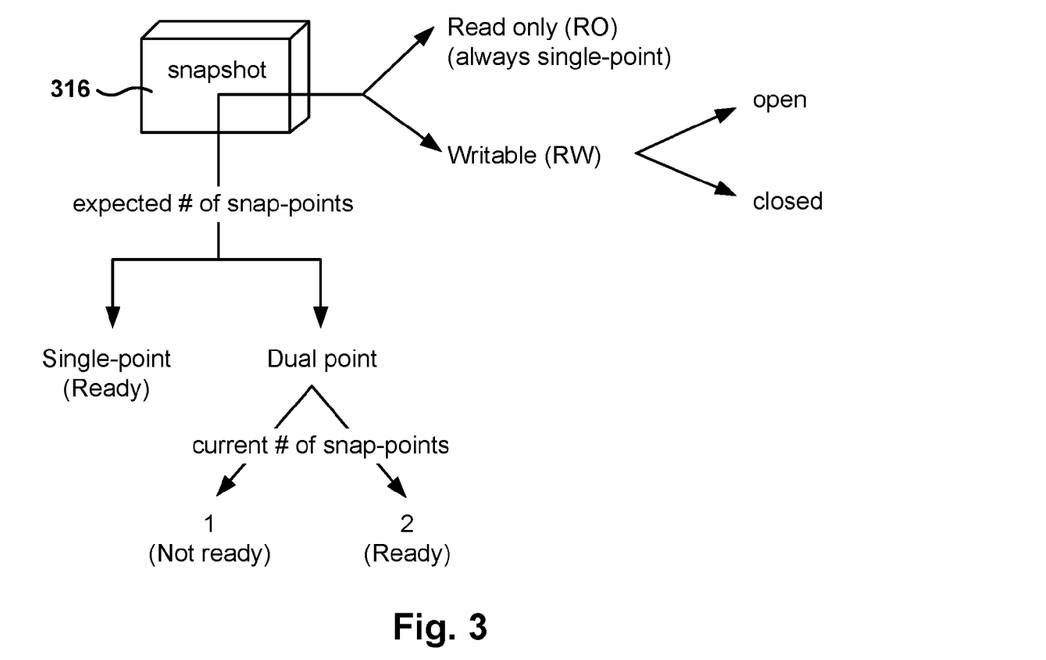
FIG. 3 illustrates the properties of different types of snapshots, according to one embodiment.

FIG. 3 illustrates the properties of different types of snapshots, according to one embodiment. A snapshot 316 can be a read-only (RO) snapshot or a writable snapshot, and the writable snapshot can be open or closed. Further, based on the expected number of snap-points to be created for a snapshot, a snapshot may be classified as single-point or multi-point (e.g., dual-point). A read-only snapshot is always a single-point snapshot.

For example, a writable snapshot may be used by applications such as Hyper-V, with the purpose to change the data in the snapshot by means of auto-recovery mechanism. The point-in-time state of such a snapshot pre-recovery and post-recovery can be identified using different snap-points. When a writable snapshot is defined to have up to two snap-points, that is snapshot is referred to as a dual-point snapshot.

A "ready" snapshot is a snapshot ready to perform any "protection operations" (e.g., clone, restore, replicate). In another embodiment, a ready snapshot is a snapshot where the current number of snap-points is equal to the expected number of snap-points. A read-only snapshot and a single-point writable snapshot are always ready. A dual-point writable snapshot will be ready after both snap-points have been created, that is, after the application has finished the auto-recovery mechanism.

As discussed above, a side branch is created of the base snap-point of the snapshot, and the branch is open if the writable snapshot can currently take writes (open branch). Otherwise, the branch is closed.

One of the differences between a writable snapshot and a clone is that the clone is a separate management entity, i.e., an entity that can be independently managed, while the snapshot is managed together with the volume that the snapshot is associated with.

However, a system administrator may be confused if there were two different entities (e.g., snap-points) for a snapshot, because the system administrator expects just one snapshot with one snap-point, that is, a snapshot that represents the volume at a point in time. Also, the system administrator will likely wish to manage the volume together with the snapshot, and not as separate entities, as it is in the case of clones.

Further, it may not be desirable to provide the ability to the application to handle snapshots with multiple snap-points because it increases the complexity of managing multiple snap-points. Therefore, in one embodiment, the snapshot is represented by a single snap-point (e.g., the latest snapshot created in time). If the application makes changes to the snapshot, the application wants the identity of the snapshot to remain the same. However, if the changes were done to a clone, it would be a confusing situation because clones are defined to be changeable. Also, clones require more management than a snapshot, and more resources. For example, a clone may require megabytes for overhead, while the snapshot may only require a few kilobytes. Using clones instead of writable snapshots is a waste of resources for many scenarios.

Figure 4:
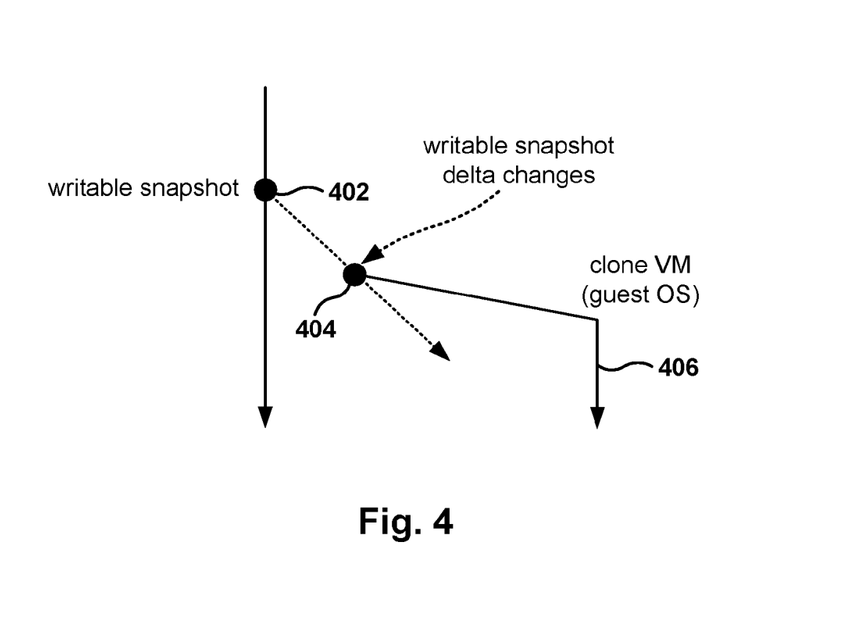
FIG. 4 illustrates the creation of a clone from a writable snapshot, according to one embodiment.

FIG. 4 illustrates the creation of a clone from a writable snapshot, according to one embodiment. FIG. 4 illustrates that a clone may be created of a writable snapshot. For example, a snapshot may be created 402, then modified to get a second snap-point 404, and then a clone 406 may be created from the second snapshot.

In one embodiment, if a snapshot is replicated, internally all the snap-points are also replicated. After replicating all the points, the snapshot is considered replicated. In one embodiment, one snap-point would be visible in the snapshot and one snap-point only would also be visible for the replica.

If the snapshot is cloned, then everything in the snapshot is included in the clone, but the head of the clone would be the head (e.g. the latest) point in the snapshot. In another embodiment, it is also possible to advertise externally the snap-points and let the application decide, when creating a clone, which snap-point to use for the clone.

Figure 5:
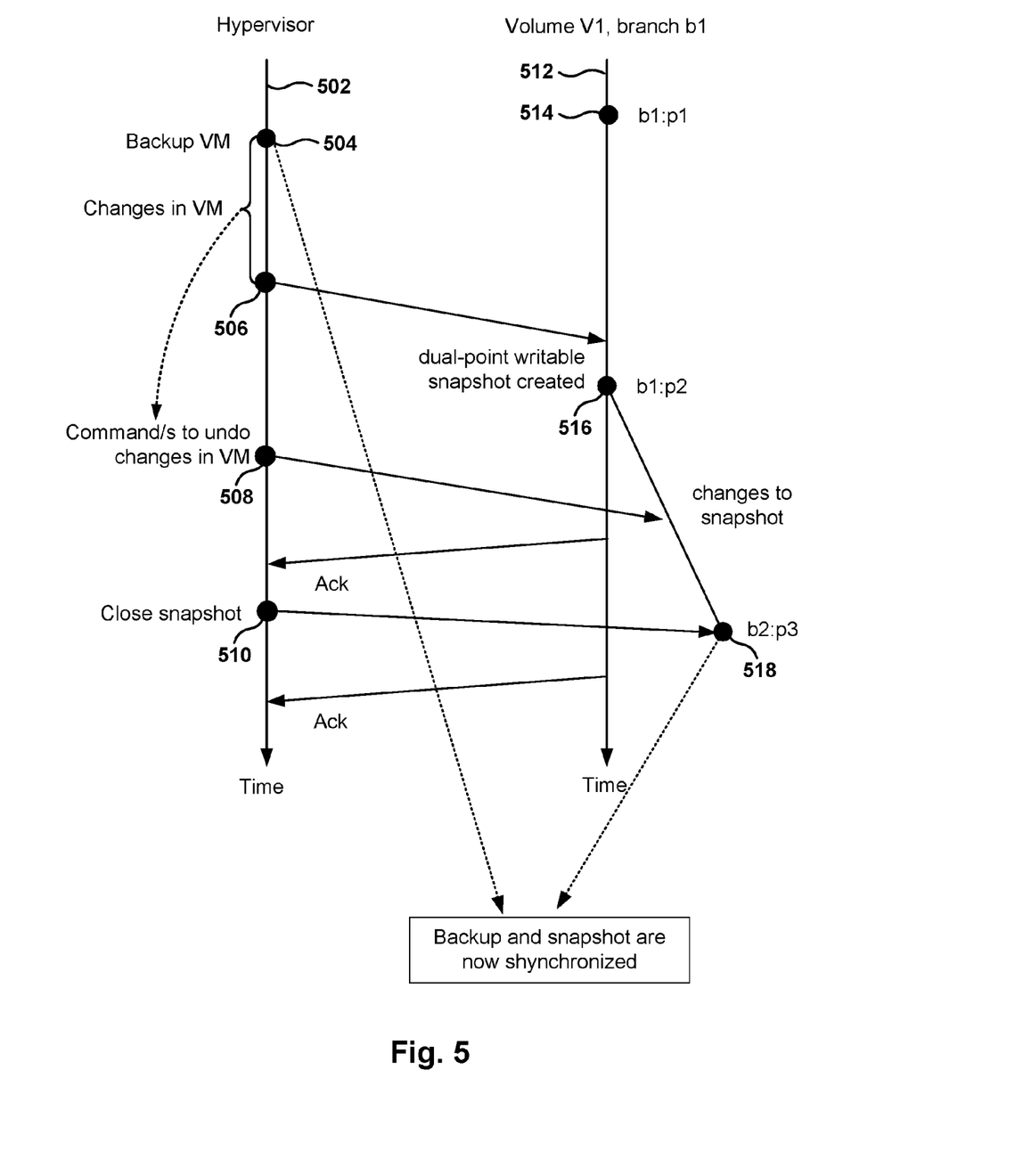
FIG. 5 illustrates the interactions between the hypervisor in the host system and the network storage device, according to one embodiment.

FIG. 5 illustrates the interactions between the hypervisor 502 in the host system and the network storage device 512, according to one embodiment. SCVMM (System Center Virtual Machine Manager) is Microsoft's product for managing large number of Virtual Machines in a Hyper-V environment. One of the requirements to support SCVMM is to be able to perform rapid provisioning of virtual machines. For example, provisioning virtual machines by using "SAN copy" technology, such as snapshot and clone. The specifications for SVVMM support are defined in SMI-S (Storage Management Initiative Specification).

SMI-S clone is a full copy of a volume whose size is the same as the size of the parent volume and that can be detached from the parent volume. SMI-S snapshot is a point in time copy of a volume whose size can grow and that cannot be detached from the parent volume.

SCVMM uses SMI-S snapshots for rapid provisioning. A typical use case is the creation of thousands of these VMs for a short time. Typically, such snapshots will be short lived (may be about a day). These VMs may not be created very often, but when the VMs are created, many of them may be created to be used as sort of a scratch space that eventually gets deleted. These writable snapshots may be used for provisioning, rather than protection, and are more similar to fully qualified volumes.

In one embodiment, the hypervisor backs up 504 the VM, and then requests 506 the storage array to backup a volume (e.g., create the snapshot). But there may be a short time between these two operations 504 and 506 where changes were made to the VM, so some changes need to be made to the snapshot to get consistency between the hypervisor backup of the VM on the state of the volume capture in the snapshot. The storage array creates 516 the dual-point snapshot b1:p2 in response to the hypervisor request 506.

Typically, to make a backup, the hypervisor freezes IOs, does the backup, unfreezes the IOs, and then asks the volume to do the snapshot with the IOs unfrozen. There may be some IOs that went through, (and the hypervisor is aware of these changes), between the backup and the time of the snapshot. So those IOs need to be "reverted" to have consistency between the backup and the snapshot.

After the snapshot is created, the hypervisor requests some changes 508 to the created snapshot. In a sense, making the modifications is like going back in time to get to the desired state of the volume at a point in time (for the snapshot) that is consistent with the VM backup.

The storage array then adds the changes 518 to the snapshot in a new branch b2:p3, and sends an acknowledgment to the hypervisor. The process of creating more snap-points may also be repeated multiple times, until all the changes have been reverted, and the hypervisor "closes" the snapshot. After all the changes have been completed, the hypervisor sends a command 510 to close the snapshot. In response to the close-snapshot command, the storage array closes the snapshot and future access to the snapshot will refer to the last snap-point p3.

The storage array sends an acknowledgment back to the hypervisor to indicate that the snapshot is now ready, and now the backup of the VM and the snapshot are synchronized. In a way, the hypervisor determines that this is the good state for the snapshot, and from that point on, referring to the snapshot means referring to the last created snap-point.

Figure 6:
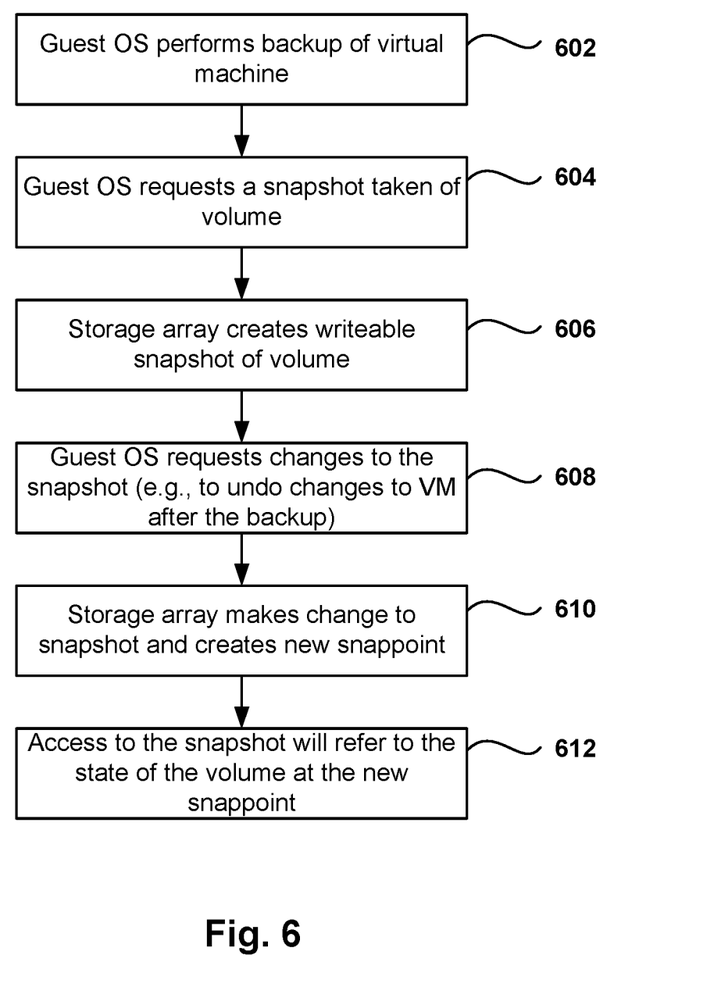
FIG. 6 is a flowchart of a method for synchronizing data between a host system and a network storage device utilizing writable snapshots, according to one embodiment.

FIG. 6 is a flowchart of a method for synchronizing data between a host system and a network storage device utilizing writable snapshots, according to one embodiment. While the various operations in this flowchart are presented and described sequentially, one of ordinary skill will appreciate that some or all of the operations may be executed in a different order, be combined or omitted, or be executed in parallel.

In operation 602, the guest OS (e.g., a hypervisor) performs the backup of a virtual machine. From operation 602, the method flows to operation 604 where the guest OS requests the snapshot of a volume. Of course, if there is more than one volume accessed by the virtual machine, the same operations may be repeated for all the volumes.

From operation 604, the method flows to operation 606 where the store array creates a writable snapshot of the volume. From operation 606, the method flows to operation 608, where the guest OS request changes to the snapshot (e.g., to undo the changes taking place in the virtual machine after the virtual machine was backed up).

From operation 608, the method flows to operation 610 where the storage array makes changes to the snapshot, as requested by the guest OS in operation 608, and creates one or more new snap-points. Further, from operation 610, the method flows to operation 612 where the snapshot is "closed." After this point in time, any access to the snapshot will refer to the state of the volume at the latest snap-point.

Figure 7A:
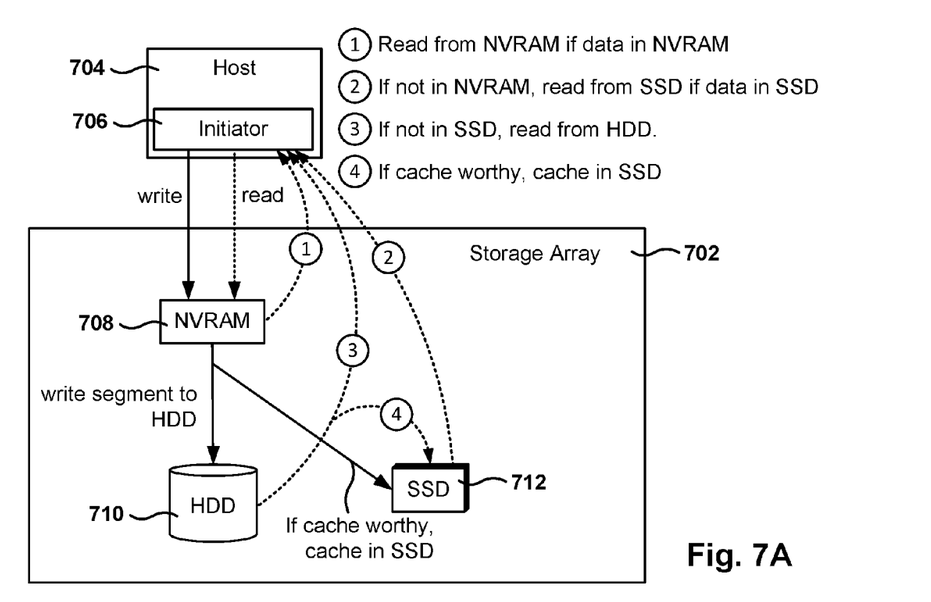
FIGS. 7A-7B illustrate the read and write paths within the storage array, according to several embodiments.
Figure 7B:
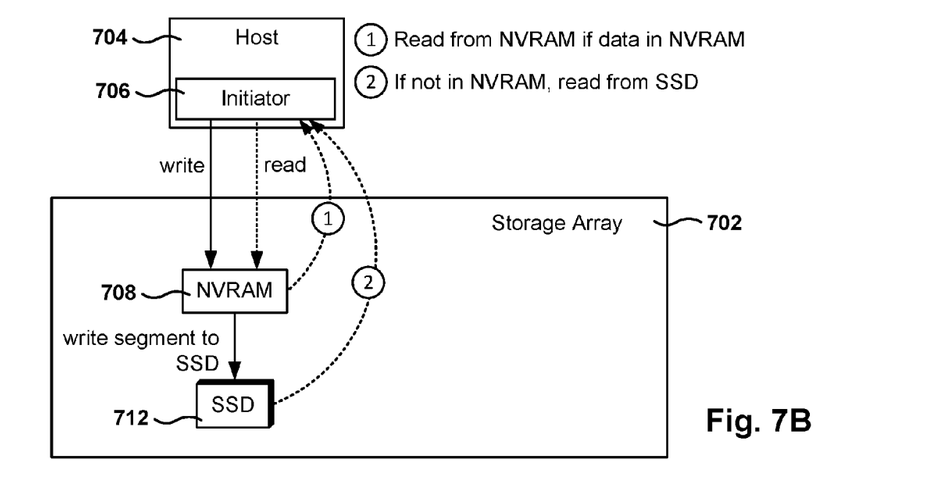

FIGS. 7A-7B illustrate the read and write paths within the storage array, according to several embodiments. FIG. 7A shows the write path for a hybrid system with SSDs and HDDs, where the initiator 706 in the host 704 sends the write request to the storage array 702. As the write data comes in, the write data is written into NVRAM 708, and an acknowledgment is sent back to the initiator (e.g., the host or application making the request). In one embodiment, storage array 702 supports variable block sizes. Data blocks in the NVRAM 708 are grouped together to form a segment that includes a plurality of data blocks, which may be of different sizes. The segment is compressed and then written to HDD 710. In addition, if the segment is considered to be cache-worthy (i.e., important enough to be cached or likely to be accessed again) the segment is also written to the solid state drive (SSD) cache 712. In one embodiment, the segment is written to the SSD 712 in parallel while writing the segment to HDD 710.

In one embodiment, the performance of the write path is driven by the flushing of NVRAM 708 to disk 710. With regards to the read path, the initiator 706 sends a read request to storage array 702. The requested data may be found in any of the different levels of storage mediums of the storage array 702. First, a check is made to see if the data is found in RAM (not shown), which is a shadow memory of NVRAM 708, and if the data is found in RAM then the data is read from RAM and sent back to the initiator 706. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 712 and sent to the initiator 706. If the data is not found in the NVRAM 708 nor in the flash cache 712, then the data is read from the hard drives 710 and sent to the initiator 706. In addition, if the data being served from hard disk 710 is cache worthy, then the data is also cached in the SSD cache 712.

FIG. 7B illustrates the read and write paths for an all-flash array having SSDs for permanent storage and no HDDs. The write path includes writing the incoming data to NVRAM 708 and later saving the data in SSD 712. The read path is also simplified as compared to the hybrid system of FIG. 7A, where the data is read from NVRAM 708 if available in NVRAM, and if the data is not found in NVRAM 708 then the data is read from SSD 712.

Figure 8:
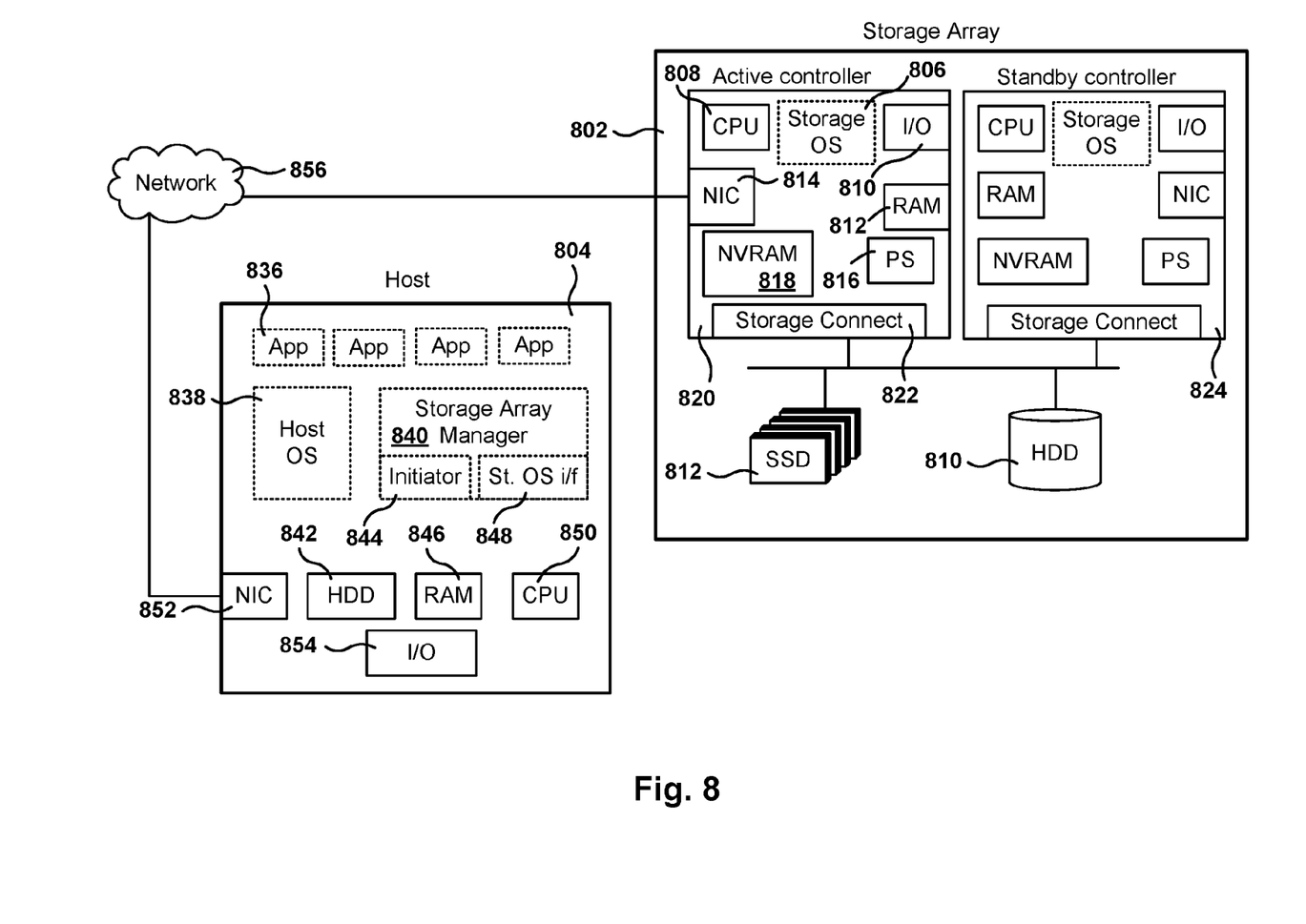
FIG. 8 illustrates the architecture of an all-flash storage array, according to one embodiment.

FIG. 8 illustrates the architecture of an all-flash storage array, according to one embodiment. In one embodiment, all-flash storage array 802 includes an active controller 820, a standby controller 824, and one or more SSDs 812. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to SSD 812.

In addition, the active controller 820 further includes CPU 808, general-purpose RAM 812 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 812. In one embodiment, standby controller 824 includes the same components as active controller 820.

Active controller 820 is configured to execute one or more computer programs stored in RAM 812. One of the computer programs is the storage operating system (OS) used to perform operating system functions for the active controller device. In some implementations, one or more expansion shelves may be coupled to storage array 802 to increase storage capacity.

Active controller 820 and standby controller 824 have their own NVRAMs, but they share SSDs 812. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 812 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

Figure 9:
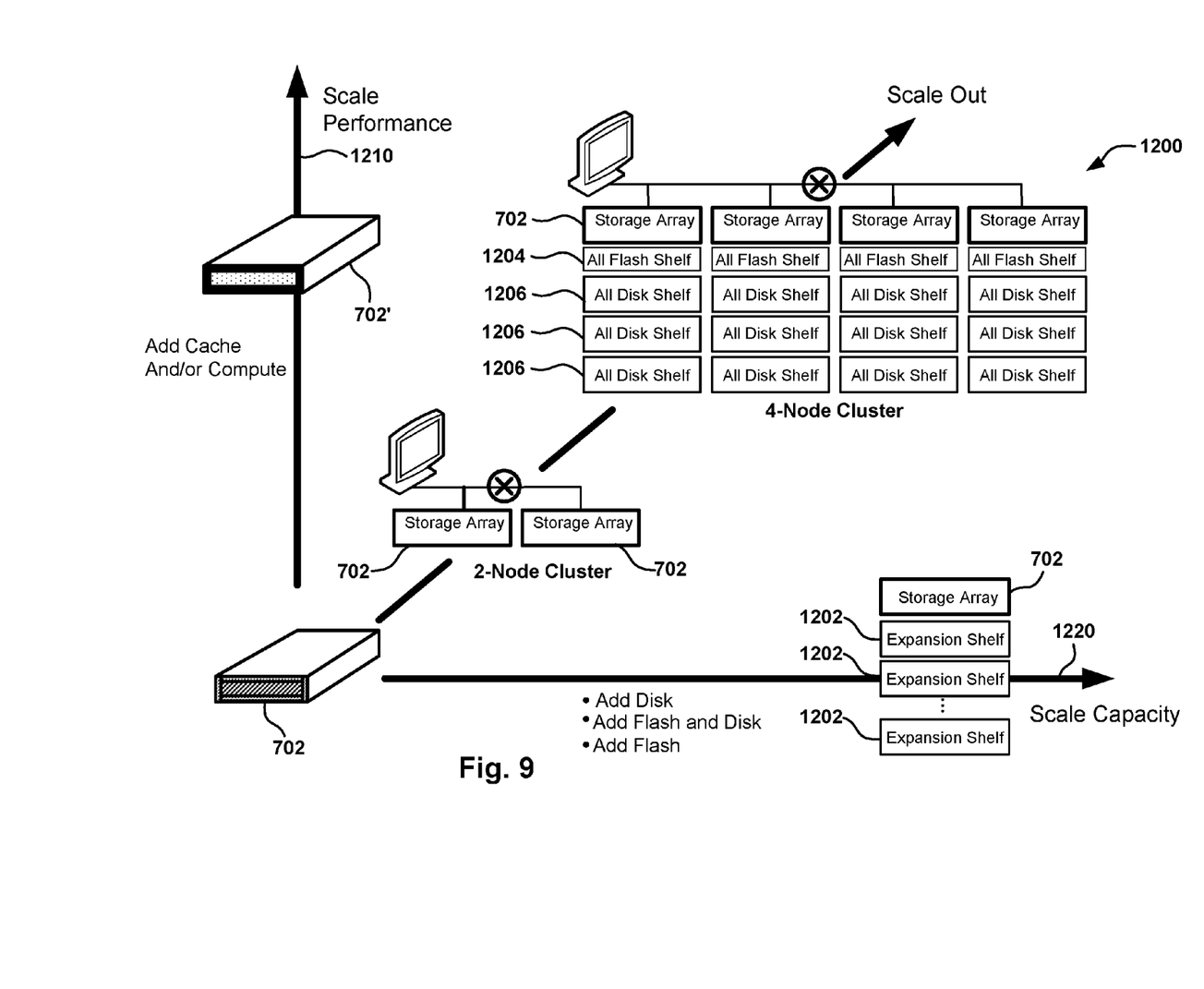
FIG. 9 is an example of the flexibility of the storage array, which can be expanded for scaling performance and for scaling capacity.

FIG. 9 is an example of the flexibility of the storage array, which can be expanded for scaling performance and for scaling capacity. In this illustration, the storage array can be adjusted to add cache and/or compute resources to define a more powerful storage array 702'. In one example, instead of upgrading the storage array 702, an upgraded storage array 702 can take its place to provide additional processing power (e.g., more powerful CPUs, higher capacity NVRAM, higher capacity DRAM, improved storage enclosure routing and buses, improved fan speeds, modified enclosure [e.g., chassis] heights [U1, U2, U3, etc.]), different power supplies, and/or other redundancy and/or memory and/or processing infrastructure.

In one embodiment, if the storage array requires additional disk or storage or flash storage memory, the storage array can be expanded to scale out by adding expansion shelves 1202 to the storage array 702. As discussed above, the expansion shelves 1202 may be defined by all-disk shelves (ADS) or all-flash shelves (AFS), or combinations of ADS and AFS shelves In a further example, the flexibility of the storage array 702 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves, but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one exemplary implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 702, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer-readable storage medium can include computer-readable storage medium distributed over a network-coupled computer system, so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method comprising:
   receiving, from a host device, a request to create a snapshot of a volume in a storage device after the host device has backed up data in the volume to generate backup data, the snapshot being a point-in-time copy of the volume in the storage device;
   creating, by the storage device, the snapshot with a first snap-point corresponding a state of the volume when the snapshot is created, wherein the snapshot is writeable when the snapshot is created;
   adding, to the snapshot, changes corresponding to a difference between the snapshot and the backup data such that the snapshot is in synchronization with the backup data generated by the host device prior to the receiving the request to create the snapshot;
   creating, by the storage device, a second snap-point for the snapshot after the changes are added to the snapshot; and
   after creation of the second snap-point, closing the snapshot to stop accesses to the snapshot, wherein the snapshot is not writeable after the snapshot is closed, wherein a request to access the snapshot after the snapshot has been closed is directed to the second snap-point of the snapshot.

2. The method as recited in claim 1, wherein the second snap-point is hidden from an application requesting the snapshot.

3. The method as recited in claim 1, further including:
   receiving a request to close the snapshot after creating the second snap-point.

4. The method as recited in claim 1, wherein the received request to create the snapshot results in the creation of the first snap-point.

5. The method as recited in claim 1, wherein the changes added to the snapshot synchronize the snapshot with a state of the volume at a specific time when the backup data is created.

6. The method as recited in claim 1, comprising: prior to adding the changes to the snapshot, receiving a request from the host device to add the changes to the snapshot.

7. The method as recited in claim 1, wherein the snapshot is a single-snap-point snapshot or a multi-snap-point snapshot.

8. The method as recited in claim 1, wherein the snapshot is an open snapshot when the snapshot is created, wherein the snapshot is a closed snapshot that does not accept more changes after the snapshot is closed.

9. The method as recited in claim 1, wherein the snapshot shares storage for common blocks with the volume, wherein a clone of the volume does not share storage with the volume.

10. A storage device, comprising:
    a processor;
    a storage array to store data of a volume; and a memory storing instructions that when executed by the processor cause the processor to:

receive, from a host device, a request to create a snapshot of the volume after the host device has backed up the data of the volume to generate backup data, the snapshot being a point-in-time copy of the volume in the storage device, create the snapshot with a first snap-point corresponding a state of the volume when the snapshot is created, wherein the snapshot is writeable when the snapshot is created, add changes to the snapshot corresponding to a difference between the snapshot and the backup data such that the snapshot is in synchronization with the backup data generated by the host device prior to the receipt of the request to create the snapshot, create a second snap-point for the snapshot after the changes are added to the snapshot, and after creation of the second snap-point, close the snapshot to stop accesses to the snapshot, wherein the snapshot is not writeable after the snapshot is closed, wherein a request to access the snapshot after the snapshot is closed is directed to the second snap-point of the snapshot.

11. The storage device as recited in claim 10, wherein the second snap-point is hidden from an application requesting the snapshot.

12. The storage device as recited in claim 10, wherein the processor is to receive a request to close the snapshot after the second snap-point is created.

13. The storage device as recited in claim 10, wherein the changes added to the snapshot are requested by a hypervisor of the host device to synchronize the snapshot with a state of a virtual machine.

14. The storage device as recited in claim 10, wherein the processor is to receive, from the host device, a request to add the changes to the snapshot.

15. The storage device as recited in claim 10, wherein the snapshot is a single-snap-point snapshot or a multi-snap-point snapshot, wherein the snapshot is an open snapshot when the snapshot is created, wherein the snapshot is a closed snapshot that does not accept more changes after the snapshot is closed.

16. A non-transitory computer-readable storage medium storing instructions that when executed by a processor cause the processor to:

receive, from a host device, a request to create a snapshot of a volume in a storage device after the host device has backed up data in the volume to generate backup data, the snapshot being a point-in-time copy of the volume in the storage device;

create the snapshot with a first snap-point corresponding a state of the volume when the snapshot is created, wherein the snapshot is writeable when the snapshot is created;

add changes to the snapshot corresponding to a difference between the snapshot and the backup data such that the snapshot is in synchronization with the backup data generated by the host device prior to the receipt of the request to create the snapshot;

create a second snap-point for the snapshot after the changes are added to the snapshot; and after creation of the second snap-point, close the snapshot to stop accesses to the snapshot, wherein the snapshot is not writeable after the snapshot is closed, wherein a request to access the snapshot after the snapshot is closed is directed to the second snap-point of the snapshot.

17. The storage medium as recited in claim 16, wherein the processor is to receive a request to close the snapshot after the second snap-point is created, wherein the second snap-point is hidden from an application requesting the snapshot.

18. The storage medium as recited in claim 16, wherein the changes added to the snapshot synchronize the snapshot with a state of the volume at a time when the backup data is created.

19. The storage medium as recited in claim 16, wherein, prior to adding the changes to the snapshot, the processor is to receive a request from the host device to add the changes to the snapshot.

20. The storage medium as recited in claim 16, wherein the snapshot is a single-snap-point snapshot or a multi-snap-point snapshot.

* * * * *